US009712343B2

(12) United States Patent
Dussmann et al.

(10) Patent No.: US 9,712,343 B2
(45) Date of Patent: Jul. 18, 2017

(54) SCALABLE TELECOMMUNICATIONS SYSTEM

(71) Applicant: Andrew Wireless Systems GmbH, Buchdorf (DE)

(72) Inventors: Alfons Dussmann, Gansheim (DE); Thomas Kummetz, Kissing (DE); Peter Schmid, Neuhausen (DE); Karl-Heinz Fackler, Wemding (DE)

(73) Assignee: Andrew Wireless Systems GmbH, Buchdorf (DE)

( * ) Notice: Subject to any disclaimer, the term of this patent is extended or adjusted under 35 U.S.C. 154(b) by 0 days.

(21) Appl. No.: 15/185,843

(22) Filed: Jun. 17, 2016

(65) Prior Publication Data

US 2017/0026199 A1    Jan. 26, 2017

Related U.S. Application Data

(60) Provisional application No. 62/182,063, filed on Jun. 19, 2015.

(51) Int. Cl.
*H04L 25/02* (2006.01)
*H04L 5/14* (2006.01)
(Continued)

(52) U.S. Cl.
CPC ............ *H04L 25/026* (2013.01); *H04B 1/38* (2013.01); *H04L 5/14* (2013.01); *H04W 52/52* (2013.01);
(Continued)

(58) Field of Classification Search
CPC ...... H04B 1/38; H04B 1/3816; H04B 1/3818; H04B 1/3833; H04B 1/3877; H04B 1/40;
(Continued)

(56) References Cited

U.S. PATENT DOCUMENTS 5,533,029 A * 7/1996 Gardner ................ H04W 88/10
370/329
6,831,901 B2   12/2004 Millar
(Continued)

OTHER PUBLICATIONS

International Search Authority, "International Search Report and Written Opinion for PCT Application No. PCT/EP2016/064233", "from Foreign Counterpart to U.S. Appl. No. 15/185,843", Sep. 22, 2016, pp. 1-12, Published in: WO.

*Primary Examiner* — Young T Tse
(74) *Attorney, Agent, or Firm* — Fogg & Powers LLC

(57) ABSTRACT

One aspect is directed to a node unit for a scalable telecommunications system. The node unit is configured to have inserted therein a respective power amplifier module and duplexing module for each of a plurality universal digital RF transceiver modules. The node unit is configured to communicatively couple an input of each power amplifier module to an output of the respective universal digital RF transceiver module. The node unit is configured to communicatively couple each universal digital RF transceiver module to respective external equipment via a duplexing module. At least one module comprises a module identifier. The system controller is configured to read the at least one module identifier and to configure the operation of at least one of universal digital RF transceiver modules, universal digital transport interface modules, and universal backplane module based on the at least one module identifier.

15 Claims, 8 Drawing Sheets

(51) Int. Cl.
*H04B 1/00* (2006.01)
*H04B 1/38* (2015.01)
*H04W 52/52* (2009.01)
*H04B 1/403* (2015.01)

(52) U.S. Cl.
CPC ............ *H04B 1/0003* (2013.01); *H04B 1/005* (2013.01); *H04B 1/406* (2013.01)

(58) Field of Classification Search
CPC ...... H04B 1/0003; H04B 1/005; H04B 1/406; H04L 5/14; H04L 25/026; H04W 52/52
USPC ........ 375/211, 219, 220, 222, 259; 370/254, 370/257, 258, 270, 277–279, 282, 293, 370/310.2, 315, 328, 338; 455/500, 507, 455/522, 526, 73, 553.1
See application file for complete search history.

(56) References Cited

U.S. PATENT DOCUMENTS

| | | |
|---|---|---|
| 6,963,552 B2 | 11/2005 | Sabat, Jr. et al. |
| 6,982,974 B1 * | 1/2006 | Saleh ................. H04L 49/1515 340/2.2 |
| 7,215,651 B2 | 5/2007 | Millar |
| 7,398,106 B2 | 7/2008 | Conyers et al. |
| 7,423,988 B2 | 9/2008 | Hedin et al. |
| 7,424,307 B2 | 9/2008 | Hedin et al. |
| 7,474,891 B2 | 1/2009 | Toms et al. |
| 7,574,234 B2 | 8/2009 | Conyers et al. |
| 7,583,735 B2 | 9/2009 | Bauman et al. |
| 7,593,450 B2 | 9/2009 | Conyers et al. |
| 7,610,046 B2 | 10/2009 | Wala |
| 7,640,019 B2 | 12/2009 | Conyers et al. |
| 7,688,135 B2 | 3/2010 | Kim et al. |
| 7,702,985 B2 | 4/2010 | Millar |
| 7,761,093 B2 | 7/2010 | Sabat, Jr. et al. |
| 7,848,747 B2 | 12/2010 | Wala |
| 7,920,858 B2 | 4/2011 | Sabat, Jr. et al. |
| 8,036,156 B2 | 10/2011 | Hedin et al. |
| 8,064,850 B2 | 11/2011 | Yang et al. |
| 8,149,950 B2 | 4/2012 | Kim et al. |
| 8,160,570 B2 | 4/2012 | Sabat, Jr. et al. |
| 8,213,884 B2 | 7/2012 | Kim et al. |
| 8,224,266 B2 | 7/2012 | Liu et al. |
| 8,270,387 B2 | 9/2012 | Cannon et al. |
| 8,274,332 B2 | 9/2012 | Cho et al. |
| 8,290,483 B2 | 10/2012 | Sabat, Jr. et al. |
| 8,326,238 B2 | 12/2012 | Yang et al. |
| 8,351,877 B2 | 1/2013 | Kim et al. |
| 8,380,143 B2 | 2/2013 | Yang et al. |
| 8,401,499 B2 | 3/2013 | Kim et al. |
| 8,467,747 B2 | 6/2013 | Kim et al. |
| 8,472,897 B1 | 6/2013 | Yang |
| RE44,398 E | 7/2013 | Conyers et al. |
| 8,509,347 B2 | 8/2013 | Kim et al. |
| 8,542,768 B2 | 9/2013 | Kim et al. |
| 8,548,403 B2 | 10/2013 | Kim et al. |
| 8,559,939 B2 | 10/2013 | Sabat, Jr. et al. |
| 8,620,234 B2 | 12/2013 | Yang et al. |
| 8,682,338 B2 | 3/2014 | Lemson et al. |
| 8,693,962 B2 | 4/2014 | Liu et al. |
| 8,724,664 B2 | 5/2014 | Stapleton et al. |
| 8,730,786 B2 | 5/2014 | Wang et al. |
| 8,731,495 B2 | 5/2014 | Yang et al. |
| 8,737,300 B2 | 5/2014 | Stapleton et al. |
| 8,737,454 B2 | 5/2014 | Wala et al. |
| 8,804,870 B2 | 8/2014 | Kim et al. |
| 8,817,848 B2 | 8/2014 | Lemson et al. |
| 8,824,595 B2 | 9/2014 | Kim et al. |
| 8,848,766 B2 | 9/2014 | Lemson et al. |
| 8,855,234 B2 | 10/2014 | Kim et al. |
| 8,873,674 B2 | 10/2014 | Kim et al. |
| 8,903,337 B2 | 12/2014 | Kim et al. |
| 8,913,689 B2 | 12/2014 | Kim et al. |
| 8,929,288 B2 | 1/2015 | Stewart et al. |
| 8,948,155 B2 | 2/2015 | Cannon et al. |
| 9,025,956 B2 | 5/2015 | Stapleton et al. |
| 9,026,067 B2 | 5/2015 | Stapleton et al. |
| 9,031,521 B2 | 5/2015 | Yang et al. |
| 9,048,797 B2 | 6/2015 | Kim et al. |
| 9,106,453 B2 | 8/2015 | Wang et al. |
| 9,112,549 B2 | 8/2015 | Stapleton |
| 9,137,078 B2 | 9/2015 | Stapleton et al. |
| 9,148,203 B2 | 9/2015 | Lemson et al. |
| 9,148,324 B2 | 9/2015 | Stapleton et al. |
| 9,197,259 B2 | 11/2015 | Kim et al. |
| 9,197,358 B2 | 11/2015 | Hejazi et al. |
| 9,225,296 B2 | 12/2015 | Kim |
| 9,236,897 B2 | 1/2016 | Stapleton et al. |
| 9,246,731 B2 | 1/2016 | Kim et al. |
| 9,363,768 B2 | 6/2016 | Hejazi et al. |
| 2004/0052372 A1 * | 3/2004 | Jakoubek ............. H04B 1/0003 380/255 |
| 2005/0157675 A1 | 7/2005 | Feder et al. |
| 2007/0241812 A1 | 10/2007 | Yang et al. |
| 2008/0152037 A1 | 6/2008 | Kim et al. |
| 2008/0174365 A1 | 7/2008 | Yang et al. |
| 2008/0181171 A1 | 7/2008 | Koziy et al. |
| 2008/0265996 A1 | 10/2008 | Kim et al. |
| 2008/0284509 A1 | 11/2008 | Kim et al. |
| 2008/0318619 A1 * | 12/2008 | Rofougaran ........ G06F 13/4234 455/550.1 |
| 2009/0085658 A1 | 4/2009 | Liu et al. |
| 2009/0096521 A1 | 4/2009 | Liu et al. |
| 2009/0146736 A1 | 6/2009 | Kim et al. |
| 2009/0285194 A1 | 11/2009 | Kim et al. |
| 2010/0176885 A1 | 7/2010 | Kim et al. |
| 2010/0271957 A1 | 10/2010 | Stapleton et al. |
| 2010/0278530 A1 | 11/2010 | Kummetz et al. |
| 2011/0156815 A1 | 6/2011 | Kim et al. |
| 2011/0158081 A1 | 6/2011 | Wang et al. |
| 2012/0039254 A1 | 2/2012 | Stapleton et al. |
| 2012/0039320 A1 | 2/2012 | Lemson et al. |
| 2012/0069880 A1 | 3/2012 | Lemson et al. |
| 2012/0135695 A1 | 5/2012 | Yang et al. |
| 2012/0147993 A1 | 6/2012 | Kim et al. |
| 2012/0154038 A1 | 6/2012 | Kim et al. |
| 2012/0155572 A1 | 6/2012 | Kim et al. |
| 2012/0314797 A1 | 12/2012 | Kummetz et al. |
| 2013/0009707 A1 | 1/2013 | Kim et al. |
| 2013/0016632 A1 * | 1/2013 | Mujtaba ............... H04B 7/0608 370/275 |
| 2013/0077713 A1 | 3/2013 | Kim et al. |
| 2013/0094612 A1 | 4/2013 | Kim et al. |
| 2013/0114486 A1 | 5/2013 | Spedaliere et al. |
| 2013/0114963 A1 | 5/2013 | Stapleton et al. |
| 2013/0128810 A1 | 5/2013 | Lee et al. |
| 2013/0147550 A1 | 6/2013 | Yang et al. |
| 2013/0214861 A1 | 8/2013 | Kim et al. |
| 2013/0243124 A1 | 9/2013 | Yang et al. |
| 2013/0251066 A1 | 9/2013 | Kim et al. |
| 2013/0315291 A1 | 11/2013 | Kim et al. |
| 2014/0010168 A1 | 1/2014 | Stapleton et al. |
| 2014/0024413 A1 | 1/2014 | Sun |
| 2014/0036770 A1 | 2/2014 | Stapleton et al. |
| 2014/0036780 A1 | 2/2014 | Sabat, Jr. et al. |
| 2014/0037292 A1 | 2/2014 | Stapleton et al. |
| 2014/0057627 A1 | 2/2014 | Hejazi et al. |
| 2014/0072064 A1 | 3/2014 | Lemson et al. |
| 2014/0072299 A1 | 3/2014 | Stapleton et al. |
| 2014/0079153 A1 | 3/2014 | Kim et al. |
| 2014/0146797 A1 | 5/2014 | Zavadsky et al. |
| 2014/0146905 A1 | 5/2014 | Zavadsky et al. |
| 2014/0146906 A1 | 5/2014 | Zavadsky et al. |
| 2014/0162664 A1 | 6/2014 | Stapleton et al. |
| 2014/0162713 A1 | 6/2014 | Stapleton et al. |
| 2014/0169263 A1 | 6/2014 | Stapleton |
| 2014/0179248 A1 | 6/2014 | Yang et al. |
| 2014/0191805 A1 | 7/2014 | Cho et al. |
| 2014/0206282 A1 | 7/2014 | Stapleton et al. |
| 2014/0219174 A1 | 8/2014 | Wang et al. |
| 2014/0223266 A1 | 8/2014 | Zhuang et al. |
| 2014/0233468 A1 | 8/2014 | Hejazi et al. |

(56) References Cited

U.S. PATENT DOCUMENTS

| | | |
|---|---|---|
| 2014/0241224 A1 | 8/2014 | Fischer et al. |
| 2014/0241461 A1 | 8/2014 | Kim et al. |
| 2014/0243033 A1 | 8/2014 | Wala et al. |
| 2014/0286247 A1 | 9/2014 | Lemson et al. |
| 2014/0306762 A1 | 10/2014 | Yang et al. |
| 2014/0306841 A1 | 10/2014 | Stapleton |
| 2014/0313075 A1 | 10/2014 | Stapleton |
| 2014/0313076 A1 | 10/2014 | Meerkerk et al. |
| 2014/0313884 A1 | 10/2014 | Stapleton et al. |
| 2014/0314061 A1 | 10/2014 | Trajkovic et al. |
| 2014/0320340 A1 | 10/2014 | Stapleton |
| 2014/0327481 A1 | 11/2014 | Kim et al. |
| 2014/0340255 A1 | 11/2014 | Meerkerk et al. |
| 2015/0080054 A1 | 3/2015 | Kim et al. |
| 2016/0080082 A1 | 3/2016 | Lemson et al. |

\* cited by examiner

SCALABLE TELECOMMUNICATIONS SYSTEM

CROSS-REFERENCE TO RELATED APPLICATIONS

A priority claim is hereby made to U.S. Provisional Application Ser. No. 62/182,063, filed Jun. 19, 2015, and titled "Scalable Telecommunications System," the contents of which are incorporated herein by reference.

BACKGROUND

Examples of telecommunications systems include distributed antenna systems (DAS's) and repeaters. The repeaters may be off-air repeaters. It is desirable for telecommunications systems to handle multiple technologies, frequency bands, or operators.

Many conventional platforms are not adapted to be readily configured or modified in the field, especially if the electrical equipment should be protected against water and dust. Off-air repeater installations can involve receiving multiple frequency bands from base stations via one or more donor antennas. The core of an off-air repeater 100 can be the frequency independent, digital main board 102 where RF cards 104 are plugged in (see FIG. 1 and FIG. 2). Each RF card 104 itself comprises the RF interface for converting received analog RF signals from a base station or user equipment into digital signals. The RF cards 104 also convert received digital signals from the digital main board 102 back to analog RF signals that are transmitted to a base station or user equipment. By design, each RF card 104 is tuned to a specific frequency range (e.g., in the GSM 900 band ranging from 880 MHz to 960 MHz) and can include a duplexer for each of the donor and coverage ports of the RF card 104. Each duplexer separates transmit (TX) signals from the receive (RX) signals (e.g., for the GSM 900 band, RX signals in the frequency band from 880 MHz to 915 MHz and TX signals in the frequency band from 925 MHz to 960 MHz). Other parts of each RF card 104 include the final power amplifier in RX and TX chain, which amplify the relevant RF signals to a desired output power. The donor and coverage ports of multiple RF cards 104 are combined into one single donor port 108 and one single coverage port 110 of the repeater 100 using a combiner 106. Off-air repeaters can be installed indoors (e.g., small sized rooms, offices, venues, malls, etc.) and outdoors (e.g., urban, rural, etc.). The output power requirements can vary, depending on the installation environment. To cover the possible installations, at least 3 different output power variants (e.g. 100 milliWatts (mW), 1 Watt (W), and 10 W) need to exist in parallel. Additionally, there are dozens of different frequency/operating bands for wireless communications worldwide, and it is expected that this number is increasing due to the required bandwidth and data throughput needs.

The number of different variants of RF cards (frequency and output power) can be numerous.

FIG. 2 depicts an example of a distributed antenna system (DAS) 200 that includes a master unit 202 and multiple remote units 204. The master unit 202 can be communicatively coupled to one or more base stations 206 by cables or other type of communication medium, including a wireless communication medium. Within the master unit 202, multiple technologies, frequency bands, or operators can be separated, first into transmit (TX) and receive (RX) signals by duplexers 208 included in a point-of-interface (POI) module 210, and then combined and split into several common TX and RX paths by transmit and receive splitter/combining matrices 212. The combined TX signals may be converted into optical signals by optical transceivers (OTRX) 214 and then fed to multiple remote units 204 via fibers 216. In other examples, communication media other than optical can be used. Within each remote unit 204, the optical signals are received and converted back to RF signals by an OTRX 218 in the remote unit 204. Each TX signal can be fed to a final amplifier 220. The individual TX signals can be combined in a multiplexer 222 and output on one or more RF ports 224 to serve the coverage area. Similar processing is performed in the upstream or receive direction.

The point of interface 210 within the master unit 202 is typically frequency dependent and includes gain adjustment elements that typically need to be adapted for the received input power of the respective the base station 206. The remote units 204 may handle multiple frequency band mixes and can be available in different output power classes. This can lead to numerous variants of the master unit 202 and remote units 204.

SUMMARY

Certain aspects and features relate to configurable platforms for telecommunications systems that can be configured and scaled to meet changing site requirements. In some examples, a telecommunications system, such as a repeater or distributed antenna system for transport of signals for wireless coverage, is built from modules (e.g., building blocks) that can be easily swapped or added to handle different types of signals or provide different performance. The modules can be categorized in different families of modules. Modules of the same family can have the same form factor so that the modules can be easily swapped. Each module can include identification information that can be detected by a system controller to determine the type of module and the performance characteristic of the module. The system controller may also self-optimize the respective unit and adjust parameters via software. A system controller may be separate from the modules, or included in one of the modules, such as a digital backplane module or a digital transport interface module.

Using certain examples can provide the ability to scale the telecommunications system to handle new RF bands, for example, and to make the system easy to assemble and modify in the field. For example, if a higher-power amplification is needed for a particular band, a lower-power power amplifier module can be swapped with one having a higher-power capability. Previously, separate components would be selected and integrated into the system. It was not possible to easily replace a component and have the system work.

The different families of modules can include power amplifier modules, digital filter element modules, digital radio frequency (RF) transceiver modules, digital transport interface modules, backplane modules, and combiner modules.

Each module listed above can also include (i) interfaces to modules of different families and (ii) a controller or other mechanism (e.g., an RFID chip) for storing and outputting a module identification.

One may easily build a telecommunications system with different combinations of power amplification levels, capability of handling different frequency ranges, and digital transport interface capabilities (e.g., optical or electrical), depending on the needs for the particular system. A system controller can identify the modules and can modify, as needed, the performance of the digital RF transceiver via software to deal with the particular other modules added.

One aspect is directed to a node unit for a scalable telecommunications system. The node unit comprises a plurality of universal digital RF transceiver modules, each of which is configured to communicatively couple the node unit to respective external equipment. The node unit further comprises one or more universal digital transport interface modules, each of which is configured to communicatively couple the node unit to a respective transport link. The node unit further comprises a universal backplane module communicatively coupled to the universal digital RF transceiver modules and to the universal digital transport interface modules. The node unit further comprises a system controller. The node unit is configured to have inserted therein a respective power amplifier module and duplexing module for each universal digital RF transceiver module. The node unit is configured to communicatively couple an input of each power amplifier module to an output of the respective universal digital RF transceiver module. The node unit is configured to communicatively couple each universal digital RF transceiver module to the respective external equipment via the respective duplexing module. At least one module comprises a respective module identifier. The system controller is configured to read the at least one module identifier and to configure the operation of at least one of the universal digital RF transceiver modules, the universal digital transport interface modules, and the universal backplane module based on the at least one module identifier.

The details of one or more aspects and examples are set forth in the accompanying drawings and the description below. Other features and aspects will become apparent from the description, the drawings, and the claims.

DETAILED DESCRIPTION

Figure 1:
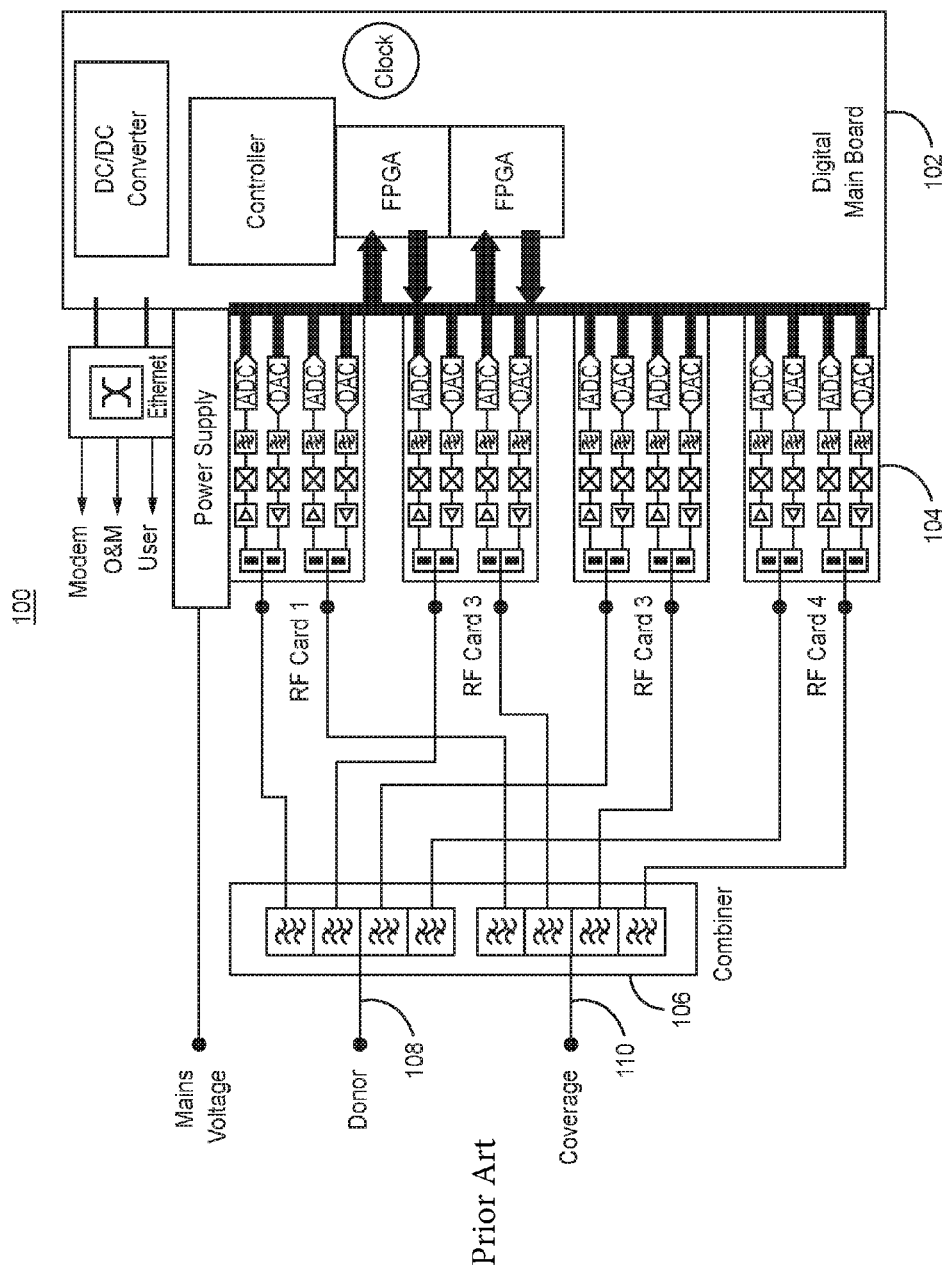
FIG. 1 is a block diagram of an example of a conventional off-air repeater.
Figure 2:
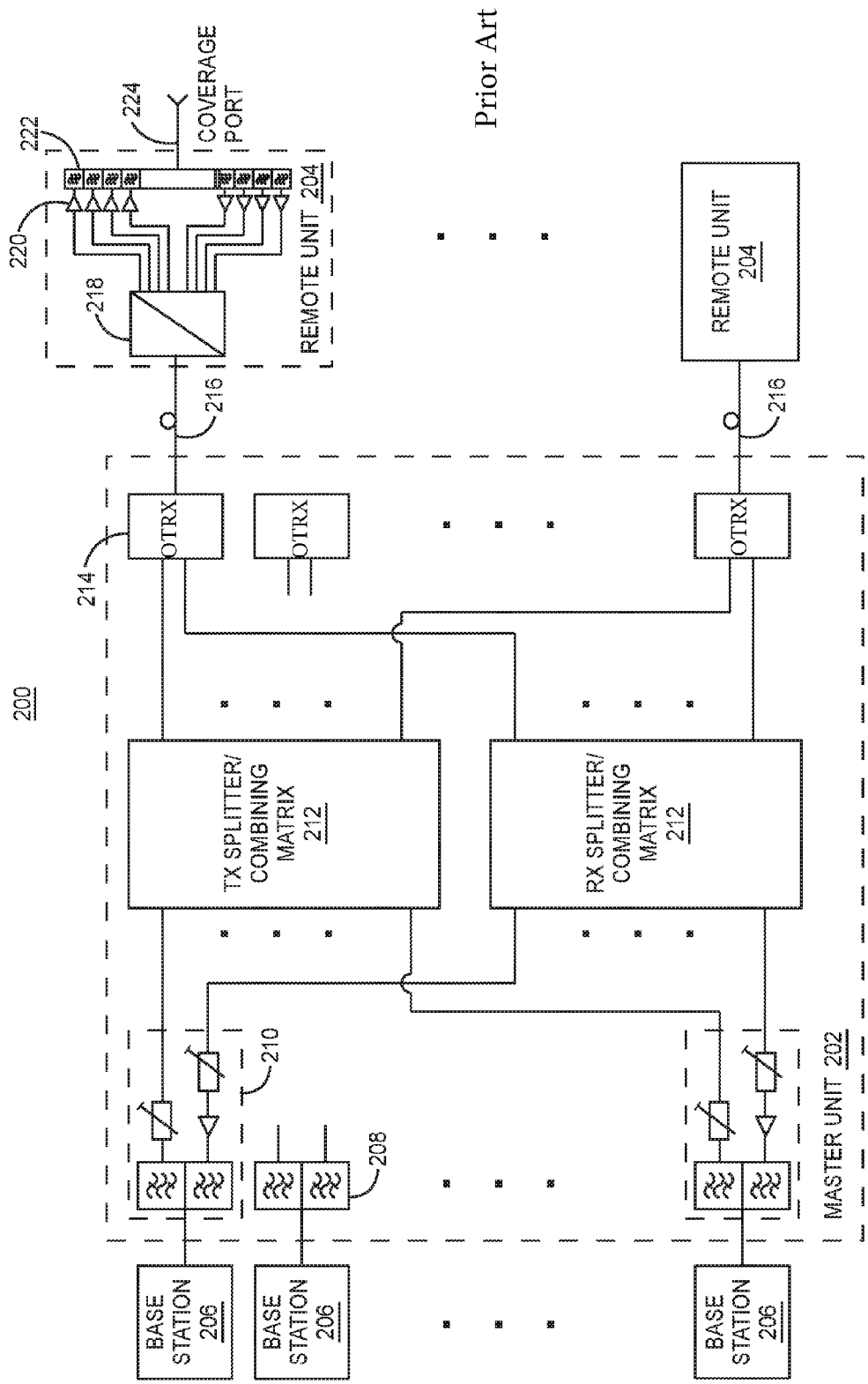
FIG. 2 is a block diagram of one example of a conventional distributed antenna system.
Figure 3A:
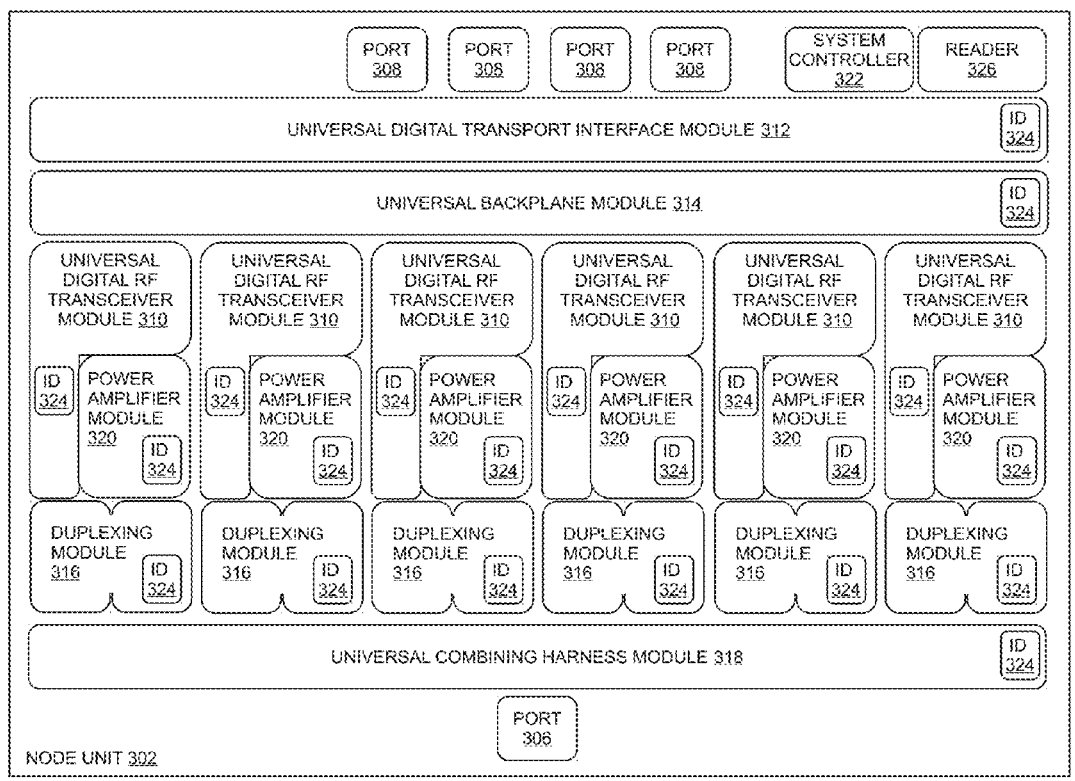
FIG. 3A is a block diagram of one example of a scalable telecommunications system with a universal combining harness module installed.
Figure 3B:
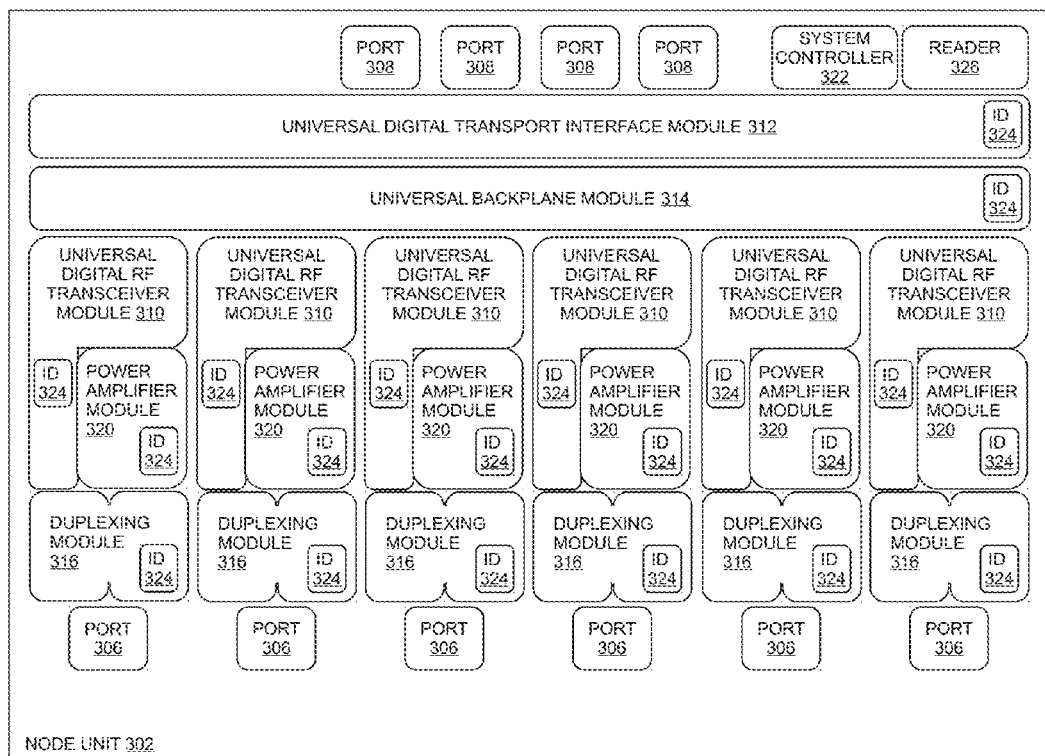
FIG. 3B is a block diagram of one example of a scalable telecommunications system without a universal combining harness module installed.

FIGS. 3A and 3B are block diagrams illustrating one example of a scalable telecommunications system 300. The scalable telecommunication system 300 shown in FIGS. 3A-3B comprises multiple nodes units 302. Each node unit 302 is communicatively coupled to at least one other node unit 302 using one or more transport links.

Each node unit 302 includes one or more external ports 306 to communicatively couple the node unit 302 to external equipment. Examples of external equipment include monolithic base station elements (such as a macro base stations, small-cell or femto-cell base stations, etc.), distributed base station elements (such as baseband units, remote radio heads, master eNodeBs, secondary eNodeBs, etc.), antenna-related equipment (such as bi-directional amplifiers, donor antennas, coverage antennas, etc.) and core-network elements (such as serving gateways (S-GW), mobility management entities (MME), etc.).

Each node unit 302 also includes one or more transport ports 308 to communicatively couple that node unit 302 to one or more other node units 302 over one or more transport communication links. Example of such transport communications links include one or more optical fibers and copper cables (such as twisted-pair category cables, and coaxial cables). Each node unit 302 can be coupled to another node unit 302 using a single cable (for example, a single optical fiber using wave division multiplexing (WDM)) or multiple cables (for example, where a first cable in used for transmitting signals from a first node unit 302 to a second node unit 302 and a second cable is used for transmitting signals from the second node 302 to the first node 302).

The node units 302 can be arranged into various systems and can be used with various combinations of power levels, frequency bands, and technologies.

Each node unit 302 includes a respective universal digital radio frequency (RF) transceiver module 310, a universal digital transport interface module 312, and a universal backplane module 314 to communicatively couple the universal digital RF transceiver modules 310 and the universal digital transport interface module 312 to each other. The universal digital RF transceiver modules 310, the universal digital transport interface module 312, and the universal backplane module 314 are "universal" in the sense that they can be used for multiple frequency, power, or technology combinations, with appropriate software reconfiguration.

When analog RF signals are received and transmitted from the external ports 306 of a node unit 302, the node unit 302 includes a duplexing module 316 for each external port 306 (FIG. 3B). Each duplexing module 316 is configured to enable bi-directional communication over a single external port 306 and to isolate the RF signals coming from the power amplifier module 320 to prevent receiver desensitization in the universal digital RF transceiver module 310.

Each duplexing module 316 comprises a filter element to filter out one or more signals in one or more frequency bands and is configured to support either frequency-divisional duplexing (FDD) or time-division duplexing (TDD). Each FDD duplexing module 316 comprises at least one duplexing filter element that filters first signals from second signals. The first signals are communicated from the respective external port 306 (directly or via an optional universal combining harness module 318 described below and shown in FIG. 3A) to an input of a respective universal digital RF transceiver module 310. The second signals are communicated from an output of the power amplifier module 320 used in the respective universal digital RF transceiver module 310 to respective external port 306 (directly or via the optional universal combining harness module 318).

Each TDD duplexing module 316 comprises at least one switching element that has a common port that is coupled to the respective external port 306 (either directly or via the optional universal combining harness module 318), an output port coupled to an input of a respective universal digital RF transceiver module 310, and an input port coupled to an output of the power amplifier module 320 used in the respective universal digital RF transceiver module 310. The switching element is configured to selectively couple either the input port or the output port to the common port under the control of a timing signal. The timing signal can be provided to the switching element from a system controller 322, the respective universal digital RF transceiver module 310, or the universal backplane module 314.

Each duplexing module 316 is designed for a particular frequency range and technology (that uses either FDD or TDD).

An optional universal combining harness module 318 (shown in FIG. 3A) can be used to combine all of the output signals output by the universal digital RF transceiver modules 310 (via the respective duplexing modules 316) and provide the combined output signals to the external port 306 and to provide the input signals received on the external port 306 to a respective input of all of the universal digital RF transceiver modules 310 (via the respective duplexing modules 316). The universal combining harness module 318 is "universal" in the sense that the combining harness module 318 is configured as a wideband combiner to combine signals having any and all possible frequency bands supported by the system 300.

If the universal combining harness module 318 is used, an external port 306 is implemented by the universal combining harness module 318. If the universal combining harness module 318 is not used, the external ports 306 are implemented by the duplexing modules 316.

Each power amplifier module 320 is configured to amplify an analog RF signals output on the associated external port 306 to a desired output power and is configured to operate in a particular frequency range and output power range. The various power amplifier modules 320 can be have different power classes and support different frequency bandwidths due to amplification technology limitations. Each power amplifier module 320 is configured to be connected to a universal digital RF transceiver module 310 in order to receive an output from that universal digital RF transceiver module 310.

In one some aspects, the duplexing modules 316 and the power amplifier modules 320 may be the only modules that are limited to a subset of the possible RF bands handled in the system 300.

Also, in some aspects, the power amplifier modules 320 cover a wider RF bandwidth than the duplexing modules 316 and can be connected to a set of duplexer filters via a splitter harness.

Each node unit 302 is configured to generate, from the input signal it receives on each of its external ports 306, a respective stream of digital samples. Also, each node unit 302 is configured to generate, for each of its transport ports 308 that is coupled to another node unit 302, a respective transport signal that includes one or more of the streams of digital samples generated from the inputs signals received on the external ports 306.

In one aspect digital samples comprises digital in-phase and quadrature (IQ) samples. Other examples can be implemented in other ways.

Each universal digital RF transceiver module 310 is configured to perform the digital processing associated with generating a stream of digital samples from the respective input signal received on the respective external port 306 and is configured to perform the digital processing associated with generating a respective output signal for the respective external port 306 from the stream of digital samples provided to the digital RF transceiver module 310 from the universal backplane module 314. Optionally, in some aspects, one or more of the digital RF transceiver modules 310 can include base station modems (e.g., BTS modems) or secondary Node B modems to drive the digital transceiver and to communicate with wireless terminal devices.

The universal digital transport interface module 312 is configured to transmit and receive streams of digital samples to and from a respective node unit 302 coupled to the other end of the transport communication link attached the associated transport port 308. Also, as noted below, in some aspects, the universal digital transport interface modules 310 combines and separates the various streams of digital samples.

The universal backplane module 314 is configured to route digital streams of digital samples to and from the digital transceiver RF modules 310 and the various inputs and outputs of the digital transport interface module 312.

In some aspects, the universal backplane module 314 is implemented as an active backplane that is configured (in a software configurable manner) to combine, for each transport port 308, the digital samples for one or more streams and route, in a software configurable manner, the combined digital samples to an appropriate input of the universal digital transport interface module 312. Also, in such an aspect, the universal backplane module 314 is configured to separate, in a software configurable manner, the streams of digital samples received on each transport port 308 and route, in a software configurable manner, the separate digital samples to the appropriate universal digital RF transceiver modules 310.

Each universal digital RF transceiver module 310 filters the respective input signal to output a frequency band of interest, levels the filtered signal (for example, by adjusting its gain), down-converts the filtered signal to an intermediate frequency (IF) or to baseband, digitizes the down-converted signal to produce real digital samples, digitally down-convert the real digital samples to produce digital in-phase and quadrature (IQ) samples, which are output to the universal backplane module 314. In such aspects, the universal digital RF transceiver module 310 can also be configured to filter, amplify, attenuate, and/or re-sample or decimate the digital IQ samples to a lower sample rate. In such aspects, the universal backplane module 314 combines, for each transport port 308, the digital samples for one or more streams (for example, by framing the digital samples together) and routes the combined digital samples to an appropriate input of the universal digital transport interface module 312.

In such aspects where the universal backplane module 314 is implemented as an active backplane, similar processing is performed in the other direction in order to generate a respective output signal for each external port 306 from a stream of digital samples provided from the digital transport interface module 312. The universal backplane module 314 separates the combined streams of digital samples received on each transport port 308 from the associated transport communication link and, for each universal digital RF transceiver module 310, digitally sums together corresponding digital IQ samples provided from the various transport ports 308 and provides the summed digital IQ samples to the appropriate universal digital RF transceiver module 310. Each universal digital RF transceiver module 310 digitally up-converts the summed digital IQ samples provided to it to produce real digital samples. Each universal digital RF transceiver module 310 can also filter, amplify, attenuate, and/or re-sample or interpolate the digital IQ samples.

Either the universal digital RF transceiver module 310 or the power amplifier module 320 coupled thereto performs a digital-to-analog process on the real samples provided in order to produce an IF or baseband analog signal and up-converts the IF or baseband analog signal to the desired RF frequency.

In some aspects, the power amplifier module 302 is configured to receive the digital samples from the associated universal digital RF transceiver module 310, convert the digital samples to an analog signal, up-convert the analog signal to an appropriate RF frequency, and amplify the analog RF signal, the result of which is output to the respective external port 306. Digital or analog pre-distortion can also be performed prior to amplification to realize more usable power from the amplifier (for example as the output power increases). In other aspects, each universal digital RF transceiver module 310 is configured to convert the digital samples to an analog signal, up-convert the analog signal to an appropriate RF frequency, and output the resulting analog RF signal to the power amplifier module 320, which amplifies the analog RF signal as described above. In such aspects, digital pre-distortion can be performed by the universal digital RF transceiver module 310.

In some aspects, the universal backplane module 314 is implemented as a passive backplane that routes one or more streams of digital samples from the outputs of the universal digital RF transceiver modules 310 to the inputs of the universal digital transport interface module 312 and routes one or more streams of digital samples from the outputs of the universal digital transport interface module 312 to the inputs of the universal digital RF transceiver modules 310. In such aspects where the universal backplane module 314 is implemented as a passive backplane, the universal digital transport interface modules 312 combines and separates the various streams of digital samples, and each universal digital RF transceiver module 310 is configured to digitally sum corresponding digital IQ samples provided from the universal digital transport interface module 312 via the universal backplane module 314.

In some example, the system 300 is configured to intelligently detect and understand how the modules 310, 312, 314, 316, 318, and 320 are connected to each other to visualize the complete system 300 and adjust it according to pre-defined rules.

Each module 310, 312, 314, 316, 318, and 320 includes a module identification (ID) 324 that identifies the module and its capabilities. The module ID 324 can be implemented in various ways. For example, the module ID 324 can be stored in a non-volatile memory within the module. The system controller 322 is coupled to one or more interfaces or readers 326 that are configured to read the module ID 324 from each module 310, 312, 314, 316, 318, and 320.

For both off-air repeaters and digital antenna systems, modules 310, 312, 314, 316, 318, and 320 can be used in a way to build up the system 300 on-the-fly according to the required needs. This may reduce the total number of the individual modules that a manufacture needs to keep in stock and can offer flexibility to upgrade and exchange frequency bands in the field for existing installations.

The system 300, as assembled, can support a combination of RF bands. The system 300 can have in-situ means, such as the system controller 322, to determine its combination of modules and mechanical system configuration. The system 300 can in a self-organizing manner, define the parameters or configure of at least one of the following: out of the multitude of controllers in the various modules, one single controller that takes over local system control tasks, the configuration of signal routing, the self-calibration of RF paths in RF gain, RF power over frequency, RF band, or RF connector, the fan collaboration in the active cooling of the system, and the self-detection of frequency dependency for passive elements such as the duplexing module 316 and the universal combing harness module 318.

Figure 3C:
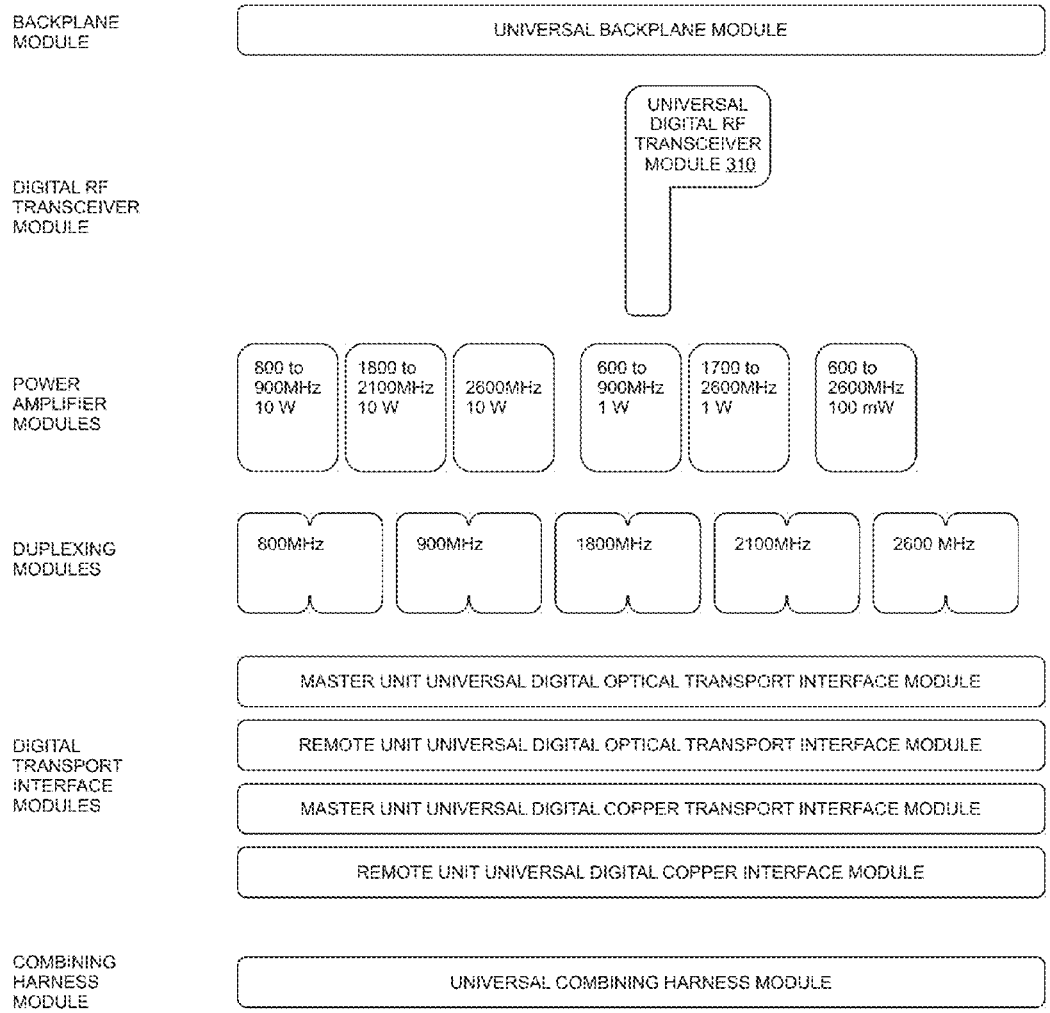
FIG. 3C is a block diagram illustrating various modules for a scalable telecommunications system.

Examples of variants of the various modules are shown in FIG. 3C. The system 300 may be an open system that allows new variants of modules or elements to be added to the list of possible modules or elements and for them to be used in new configurations without the prior need to change the software. It can be achieved by exchanging element/module descriptions and technical data files that the system software is able to read and interpret.

The overall functionality in other examples can be split differently than above. For example, each power amplifier module 320 may not be limited to one link only. Parts of the universal digital RF transceiver module 310 functionality may instead be realized in the power amplifier module 320 (e.g. amplification of the received RF signal coming from the duplexing module 316 or the conversion of RF into digital signals).

Although the universal digital RF transceiver modules 310 are described above as being to interface with external equipment using an analog RF interface, it is to be understood that the universal digital RF transceiver modules 310 can be configured to interact with external equipment using a digital interface, in which case the digital RF transceiver module 310 is configured to convert between the digital interface format used for such external equipment and a digital format suitable for communication over the digital transport links. For example, in some examples, a distributed base station component (such as a baseband unit (BBU)) can be coupled to a universal digital RF transceiver module 310 using a digital IQ interface (for example, a Common Public Radio Interface (CPRI) digital IQ baseband interface). Other digital RF formats can be used.

Figure 4:
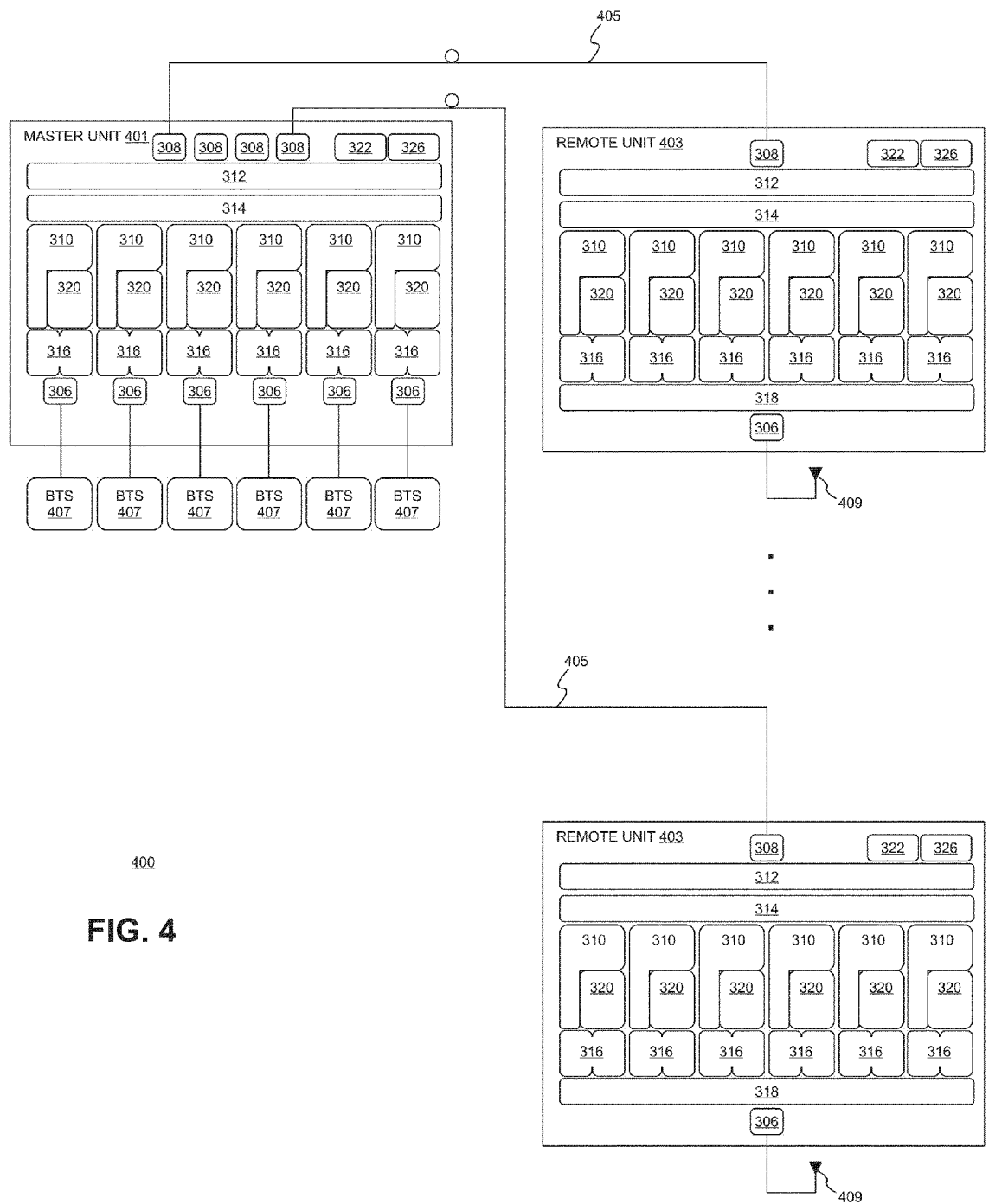
FIG. 4 is a block diagram of one example of a distributed antenna system built with the modules and nodes units of FIGS. 3A-3C.

FIG. 4 is a block diagram of one example of a distributed antenna system 400 built with the modules and nodes units of FIGS. 3A-3C.

In the example shown in FIG. 4, the node units 302 are arranged and configured as a distributed antenna system (DAS) 400. In the example shown in FIG. 4, one of the node units 302 is arranged and configured to function as a master unit 401 of the DAS 400, and multiple other node units 302 are arranged and configured to function as remote antenna units 403 of the DAS 400. The multiple remote antenna units 403 are located remotely from the master unit 401. The master unit 401 is communicatively coupled to each of the remote antenna units 403 over a respective transport communication link (which is implemented using a pair of optical fibers 405 in this example). Each pair of optical fibers 405 is coupled to a respective transport port 308 of the master unit 401 and a transport port 308 of a respective remote antenna unit 403.

In this example, the master unit 401 is communicatively coupled to multiple base stations 407 using an analog RF interface. Each base station 407, in this example, is coupled to a respective one of the external ports 306 of the master unit 401 using a respective one or more cables.

In this example, each remote antenna unit 403 is communicatively coupled to a respective one or more antennas 409. The antennas 409 are coupled to an external port 306 of the respective remote antenna unit 403. In this example, each external port 306 is implemented by a respective duplexing module 316 in the master unit 401.

In this example, the master unit 401 generates one or more downstream streams of digital in-phase/quadrature (IQ)

samples from the analog downstream RF input received from a base station 407 on each external port 306 of the master unit 401.

In the downlink direction, transmit signals from the base stations 407 can be fed to respective digital RF transceiver modules 310 in the master unit 401 via a respective duplexing module 316. As described, above each digital RF transceiver module 310 generates, from the transmit signal it receives, a respective stream of digital samples, which are provided to the universal backplane module 314 in the master unit 401. In this example, the universal backplane module 314 in the master unit 401 combines the digital samples from all of the universal digital RF transceiver modules 310 (for example, by framing the digital samples together) and provides the combined digital samples to an appropriate input of the digital transport interface module 312 for each transport port 308, which optically transmits the combined digital samples to a respective one of the remote units 403.

The digital transport interface module 312 in each remote unit 403 receives the optically transmitted downstream combined digital samples and provides the combined digital samples to the universal backplane module 314 in the remote unit 403. The universal backplane module 314 separates the combined digital samples for the various streams and routes each stream to an appropriate digital RF transceiver module 310 in the remote unit 403, which (along with the associated power amplifier module 320) generates a respective transmit analog RF signal. The various transmit analog RF signals are combined by the universal combing hardness module 318 in the remote unit 403 and the resulting combined signal is radiated from the one or more antennas 409.

In an uplink direction, at each remote unit 403, combined receive RF signals are received via the associated antenna 409 on the external port 306. The combined receive RF signals are split to the individual frequency bands via the universal combiner harness module 318 and the duplexing modules 316 and the resulting individual receive RF signals are provided to respective digital RF transceiver modules 310 in the remote unit 403. As described, above each digital RF transceiver module 310 in the remote unit 403 generates, from the receive signal it receives, a respective stream of digital samples, which are provided to the universal backplane module 314 in the remote unit 403. In this example, the universal backplane module 314 in each remote unit 403 combines the digital samples from all of the universal digital RF transceiver modules 310 (for example, by framing the digital samples together) and provides the combined digital samples to an appropriate input of the digital transport interface module 312 for the transport port 308, which optically transmits the combined digital samples to the master unit 401.

Each digital transport interface module 312 in the master unit 401 receives the optically transmitted upstream combined digital samples and provides the combined digital samples to the universal backplane module 314 in the master unit 401. The universal backplane module 314 separates the combined digital samples for the various streams from each of the remote units 403, and, for each universal digital RF transceiver module 310, digitally sums together corresponding digital samples provided from the various remote units 403 and routes the summed digital samples to the appropriate universal digital RF transceiver module 310, which (along with the associated power amplifier module 320) generates a respective receive analog RF signal that is output to the appropriate base station 407.

Alternatively, some or all base stations 407 can be coupled to the master unit 401 using a digital interface (for example, a digital IQ format or other digital RF format).

Figure 5:
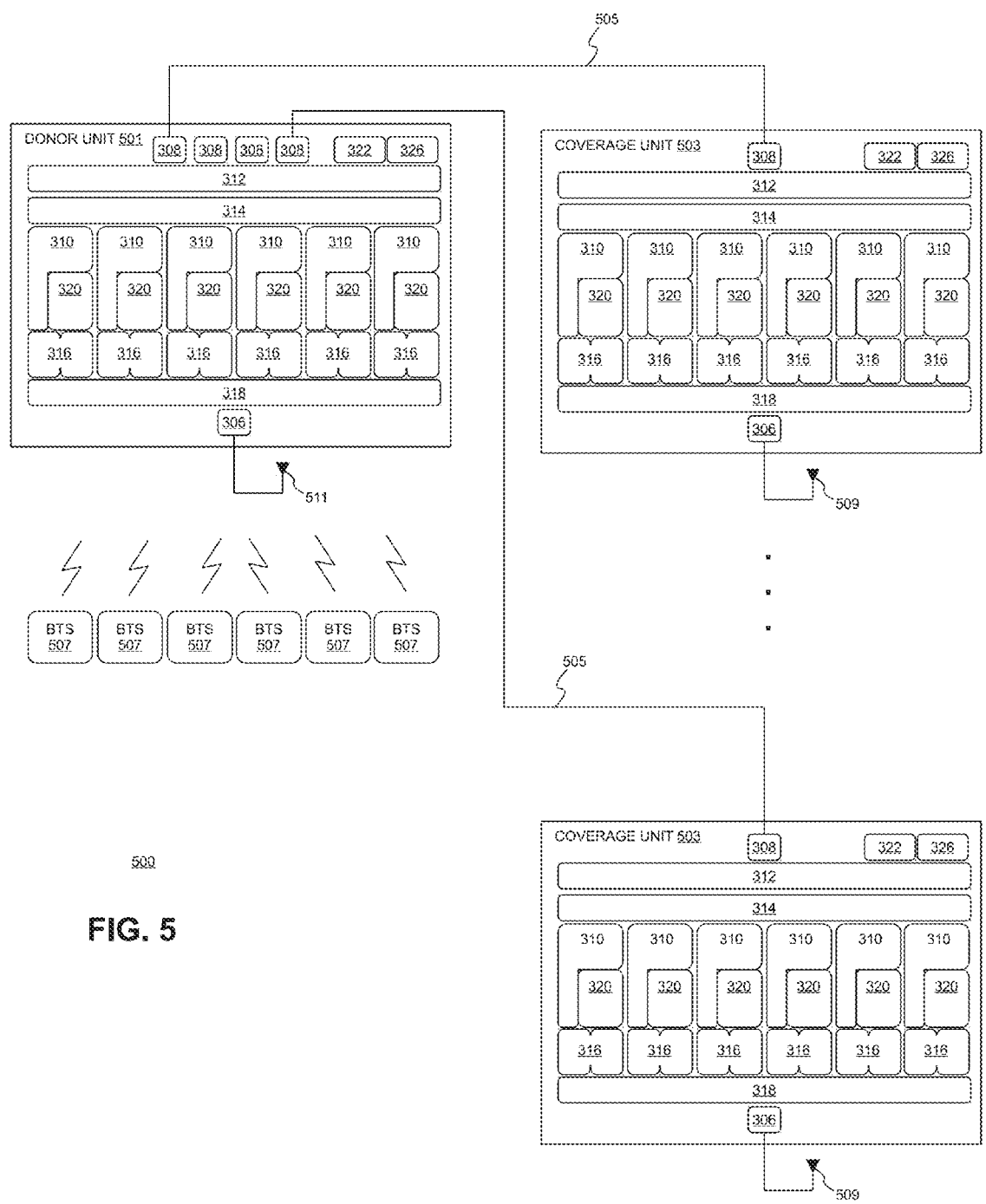
FIG. 5 is a block diagram of one example of a repeater architecture implemented using the modules and node units of FIGS. 3A-3C.

FIG. 5 is a block diagram of one example of a repeater 500 built with the modules and nodes units of FIGS. 3A-3C.

In the example shown in FIG. 5, the node units 302 are arranged and configured as an off-the-air repeater 500. In the example shown in FIG. 5, one of the node units 302 is arranged and configured to function as a donor unit 501 of the repeater 500, and multiple other node units 302 are arranged and configured to function as coverage units 503 of the repeater 500. The multiple coverage units 503 are located remotely from the donor unit 501. The donor unit 501 is communicatively coupled to each of the coverage units 503 over a respective transport communication link 505 (which is implemented using copper cable links (e.g., CAT cables)). Each cable 505 is coupled to a respective transport port 308 of the donor unit 501 and a transport port 308 of a respective coverage unit 503.

The processing performed in the donor units 501 and the coverage units 503 is similar to that performed by the master unit 401 and the remote units 403 of FIG. 4, except that in the example shown in FIG. 5, RF signals transmitted over the air by the base stations 507 are combined in the wireless channel. The combined transmit RF signals are received via one or more donor antennas 511 and provided to an external port 306 of the donor unit 501. The combined transmit RF signals are split to the individual frequency bands via the universal combiner harness module 318 and the duplexing modules 316 in the donor unit 501 and the resulting individual transit RF signals are provided to respective digital RF transceiver modules 310 in the donor unit 501. Also, as the coupling loss to the individual base stations 507 may be higher, the power amplifiers modules 320 in the donor node 501 can be selected so as to provide more output power compared to the power amplifier modules 320 used in the master unit 401 shown in FIG. 4.

Referring again to FIGS. 3A-3C, active modules (e.g., universal backplane module 314, universal digital RF transceiver modules 310, power amplifier modules 320, digital transport interface modules 312, and any FDD/TDD duplexing modules 316) may be permanently powered-up and are often communicating with the system controller 322 through an internal bus (e.g., a bus implemented using PC, RS485, Ethernet, etc.). When a different new active module is added to a previously empty slot or position in a node unit 302 or an existing active module is removed and replaced with a different active module, that newly added active module can be detected by the system controller 322 due to the ongoing bus communication and the detection of a different module ID 324.

Passive modules (e.g., FDD duplexing module 316 and the universal combiner harness module 318) may not be detected in the same manner as active modules as it may not be cost effective to supply voltage to an otherwise passive module just to communicate with a non-volatile memory to determine the module ID 324 of that module. The following is an example of alternative mechanisms to enable the system to identify passive modules (or other types of modules, if desired):

In some examples, each of the modules can be equipped with a bar code label that that includes ID information. In the case of a new module to be inserted or an existing module to be swapped, a system-wide process can be used to scan the modules. For example, the process can start an optical detector (e.g., camera) 326 inside the system or can establish a communication link to external equipment (e.g., a mobile device such as a smartphone) with an optical detector 326 that is able to scan the module IDs 324 of the modules.

In other examples, each of the modules can be equipped with a quick response (QR) code label that includes the ID information. In the case of a new module to be inserted or an existing module to be swapped, a system-wide process can be used to scan the modules. For example, the process can start an optical detector (e.g., camera) 326 inside the system or can establish a communication link with external equipment with an optical detector 326 (e.g., a mobile device such as a smartphone) that is able to scan the module IDs 324 of the modules.

In still other examples, each of the modules can be equipped with an RFID (radio-frequency identification) chip or tag that includes the module ID 324. In the case of a new module to be inserted or an existing module to be swapped, a system-wide process can be used to scan the modules. The process can begin with an RFID scanner 326 inside the system or a communication link to external equipment with an RFID scanner to read the module IDs 324 from the RFID tags of the modules.

Figure 6:
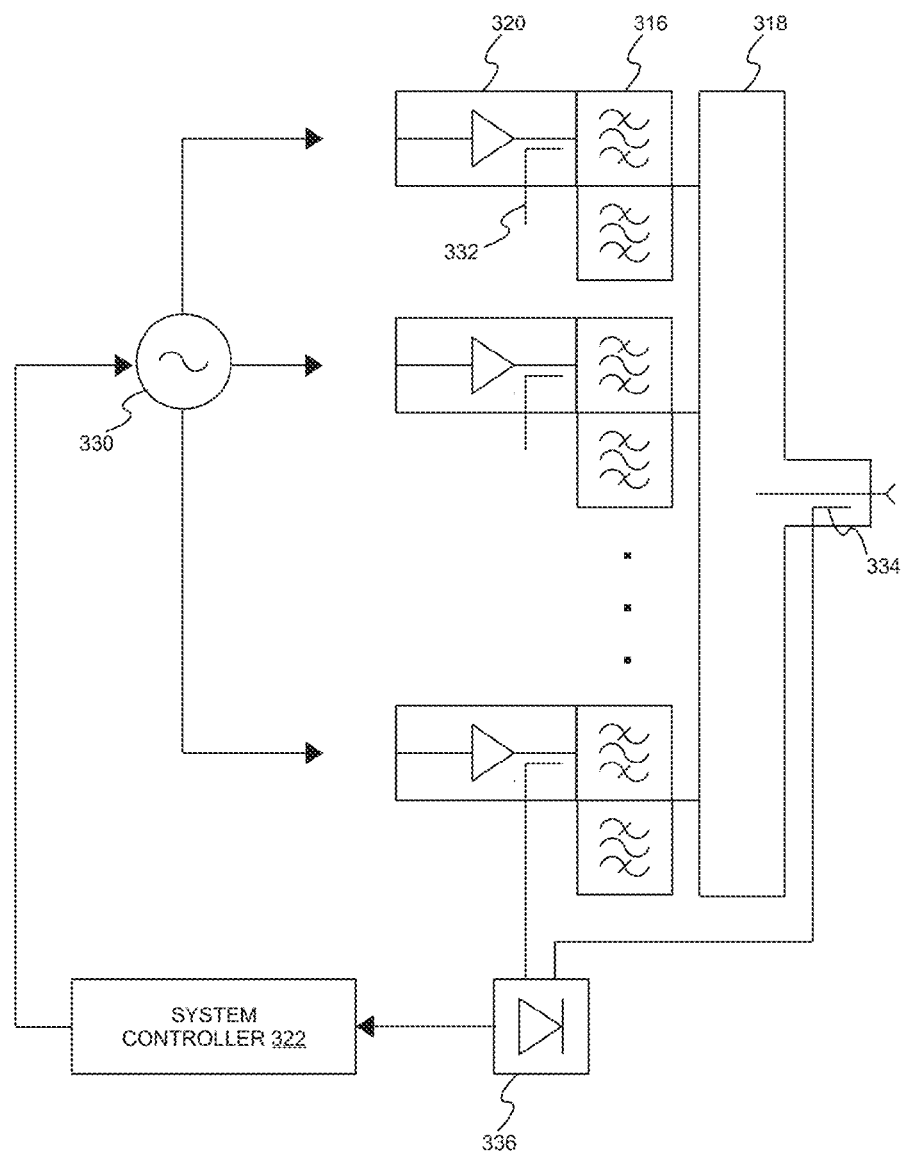
FIG. 6 is a block diagram of one example of a system for scanning an RF spectrum.

In other examples in which the passive modules do not have any identification, such as bar codes, QR codes, or RFID tags, measurements can be used to determine which modules are connected. One example of a system for doing this is shown in FIG. 6. As shown in FIG. 6, the system controller 322 can start an RF scanning process for each possible supported frequency range in a power amplifier module 320 frequency range. In the example shown in FIG. 6, the node unit 302 further includes a continuous wave (CW) tone generator 330 that can inject a CW tone into the various signal paths of the node unit 302 starting at the input of each power amplifier module 320. A respective coupler 332 is provided at the output of each power amplifier module 320 and input to the corresponding duplexer module 316. Another coupler 334 is provided at the common output of the universal combining hardness module 318. The couplers 332 and 334 are connected to a power detector 336, which can selectively determine the power level at any of the couplers 332 and 334.

The system controller 322 can cause the CW tone generator 330 to sweep the CW tone in certain frequency steps associated with various frequency band supported by the modules. The power detector 336 can measure the power level at each of the first detectors 332 before each duplexing module 316 and at the second power detector 334 after the universal combiner harness module 318. For frequencies within the passband, the detected output power at the second coupler 336 should be close to the rated output power, whereas, for frequencies within the stop band, the output power should be much lower. By repeating the CW tone sweep for each individual transmit link, the multiple pass bands can be detected.

In some examples, the system can detect new frequency bands and, rather than adapting via software, can output information that identifies to software the frequency bands that is supported by the modules.

The foregoing description of the examples, including illustrated examples, has been presented only for the purpose of illustration and description and is not intended to be exhaustive or to limit the subject matter to the precise forms disclosed. Numerous modifications, adaptations, and uses thereof will be apparent to those skilled in the art without departing from the scope of this disclosure. The illustrative examples described above are given to introduce the reader to the general subject matter discussed here and are not intended to limit the scope of the disclosed concepts.

What is claimed is:

1. A node unit for a scalable telecommunications system, the node unit comprising:
    a plurality of universal digital radio frequency (RF) transceivers, wherein each of the plurality of universal digital RF transceivers is configured to communicatively couple the node unit to a respective external equipment;
    one or more universal digital transport interfaces, wherein each of the one or more universal digital transport interfaces is configured to communicatively couple the node unit to a respective transport link;
    a universal backplane communicatively coupled to the plurality of universal digital RF transceivers and to the one or more universal digital transport interfaces; and
    a system controller;
    wherein the node unit is configured to have inserted therein a respective power amplifier and duplexer for each universal digital RF transceiver;
    wherein the node unit is configured to communicatively couple an input of each power amplifier to an output of the plurality of universal digital RF transceivers;
    wherein the node unit is configured to communicatively couple each universal digital RF transceiver to the respective external equipment via the respective duplexer;
    wherein at least one of the universal digital RF transceivers, the universal digital transport interfaces, the universal backplane, and the respective power amplifier and duplexer comprises a respective module identification (ID); and
    wherein the system controller is configured to read the respective module ID and to configure the operation of at least one of the universal digital RF transceivers, the universal digital transport interfaces, and the universal backplane based on the respective module ID.

2. The node unit of claim 1, wherein the node unit is further configured to communicate via a universal combiner harness that is coupled to each of the duplexers.

3. The node unit of claim 1, wherein each universal digital RF transceiver is configured to receive a first input from the respective external equipment and output respective first digital samples associated with the respective first input to the universal backplane;
    wherein each universal digital transport interface is configured to receive respective second digital samples from the universal backplane and to output a respective first output to the respective transport link;
    wherein the respective second digital samples received at each universal digital transport interface are derived from the respective first digital samples output from one or more of the universal digital RF transceivers;
    wherein each universal digital transport interface is configured to receive a second input from the respective transport link and output respective third digital samples associated with the respective second input to the universal backplane;
    wherein each universal digital RF transceiver is configured to receive respective fourth digital samples from the universal backplane and to output a respective second output to the respective external equipment; and
    wherein the respective fourth digital samples received at each universal digital RF transceiver are derived from the respective third digital samples output from one or more of the universal digital transport interfaces.

4. The node unit of claim 1, wherein the universal backplane comprises at least one of an active universal backplane and a passive universal backplane.

5. The node unit of claim 1, wherein the system controller is configured to configure the operation of at least one of the universal digital RF transceivers, the universal digital transport interfaces, and the universal backplane based on the respective module ID by doing at least one of:
- identifying the system controller from among a number of other controllers in the scalable telecommunications system;
- configuring routing in the universal backplane;
- configuring a signal path in at least one of the universal digital RF transceivers;
- configuring cooling of the node unit; and
- detecting a frequency range of at least one duplexer.

6. The node unit of claim 5, wherein configuring the signal path in at least one of the universal digital RF transceivers comprises configuring at least one of an RF frequency band for the signal path, a gain in the signal path, a connector in the signal path, and a power level in the signal path.

7. The node unit of claim 1, wherein each power amplifier, duplexer, universal digital RF transceiver, universal digital transport interface, and universal backplane comprises a respective module ID.

8. The node unit of claim 1, wherein the node unit is further configured to determine a respective frequency range associated with each duplexer.

9. The node unit of claim 1, wherein the external equipment comprises at least one of: a monolithic base station, a distributed base station, an antenna-related equipment, and a core-network element.

10. The node unit of claim 1, wherein each duplexer comprises at least one of a frequency division duplexing (FDD) duplexer and a time division duplexing (TDD) duplexer.

11. The node unit of claim 1, wherein each module ID is stored in at least one of: a memory device, a bar code label, a quick response (QR) code label, and a radio frequency identifier (RFID) chip.

12. The node unit of claim 1, wherein the node unit further comprises a reader configured to read the respective module ID from at least one of: a memory device, a bar code label, a quick response (QR) code label, and a radio frequency identifier (RFID) chip.

13. The node unit of claim 1, wherein the node unit is further configured to function as at least one of: a master unit of a distributed antenna system, a remote unit of a distributed antenna system, a donor unit of a repeater, and a coverage unit of a repeater.

14. The node unit of claim 1, wherein the plurality of universal digital RF transceivers, the one or more universal digital transport interfaces, and the universal backplane are each reconfigurable with respect to at least one of frequency, power, and duplexing technology.

15. The node unit of claim 14, wherein the plurality of universal digital RF transceivers, the one or more universal digital transport interfaces, and the universal backplane are each reconfigurable at least partially through software.

\* \* \* \* \*